(12) United States Patent
Li et al.

(10) Patent No.: US 7,027,677 B2
(45) Date of Patent: Apr. 11, 2006

(54) INTEGRATING OPTICAL COMPONENTS ON A PLANAR LIGHT CIRCUIT

(75) Inventors: Ruolin Li, Santa Clara, CA (US); Ut Tran, San Jose, CA (US); Xuejun Ying, San Jose, CA (US); Jun Liu, San Ramon, CA (US); Yi Ding, Milpitas, CA (US); Hiroaki Fukuto, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 10/848,924

(22) Filed: May 19, 2004

(65) Prior Publication Data

US 2005/0259910 A1     Nov. 24, 2005

(51) Int. Cl.
*G02B 6/12* (2006.01)

(52) U.S. Cl. .......................................... 385/14; 385/130

(58) Field of Classification Search ............ 385/14–16, 385/129–132; 257/499
See application file for complete search history.

(56) References Cited

U.S. PATENT DOCUMENTS

| 2004/0223682 A1* | 11/2004 | Ding et al. | 385/14 |
| 2005/0117831 A1* | 6/2005 | Komiya et al | 385/14 |

* cited by examiner

*Primary Examiner*—Phan Palmer
(74) *Attorney, Agent, or Firm*—Trop, Pruner & Hu, P.C.

(57) ABSTRACT

Optical components may be integrated into planar light circuits. For example, thin film filters may be integrated through trenches in planar light circuits to achieve demultiplexing of at least two multiplexed optical wavelengths. An optical waveguide may be interfaced with a laser or a light detector through a mode converter formed as a trench in the planar light circuit. The mode converter may have a curved surface to achieve mode conversion.

21 Claims, 4 Drawing Sheets

US 7,027,677 B2

INTEGRATING OPTICAL COMPONENTS ON A PLANAR LIGHT CIRCUIT

BACKGROUND

This invention relates generally to optical communication systems.

Conventionally, optical communications use a number of different wavelengths of light multiplexed over a common transmission path. The transmission path may be an optical fiber or waveguide. The waveguide may be part of a planar light circuit. A planar light circuit is an integrated circuit that includes an optical transmission path.

Conventionally, additional light signals of distinct wavelengths are added to the optical transmission path and light signals are removed from the optical transmission signal path by an optical add drop multiplexer (OADM). These multiplexers usually use Mach-Zehnder interferometers where identical Bragg gratings are created in two arms to add or drop a single wavelength channel. The Mach-Zehnder interferometers present challenges in planar grating fabrication, device dimensioning, and wafer level production.

Thus there is a need for other ways to integrate optical components on planar light circuits.

DETAILED DESCRIPTION

Figure 1:
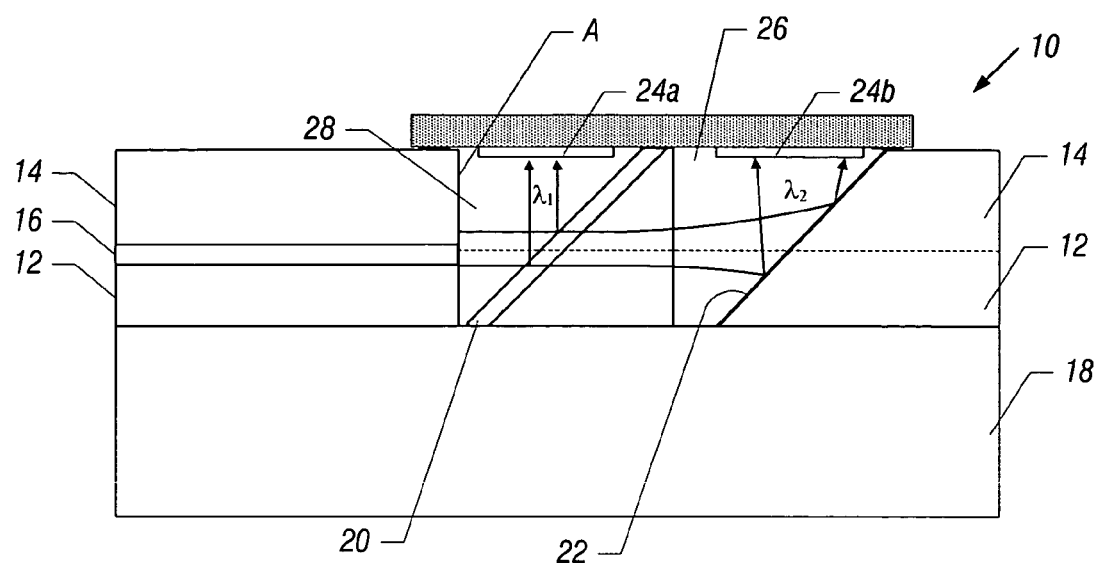
FIG. 1 is an enlarged cross sectional view of one embodiment to the present invention.

Referring to FIG. 1, a de-multiplexing planar light circuit 10 may include a silicon substrate 18. Over the substrate 18 may be a lower cladding 12 and an upper cladding 14. Between the upper and lower claddings 12 and 14 may be a waveguide core 16. The waveguide core 16 may be formed using conventional techniques including integrated circuit fabrication techniques.

A first trench having, in one embodiment, a vertical wall A and an opposed angled wall may be formed through the upper cladding and lower cladding 12 and 14. On the angled wall, a mirrored surface 22 may be formed. The mirrored surface 22 and the trench may be filled with a material 26. In some embodiments, the material 26 may be epoxy or polymer whose refractive index is close to that of the lower cladding 12 in order to reduce beam divergence.

A second trench may be formed into the material 26. Again the same vertical wall A may be defined together with a new angled side wall. The new angled side wall may be covered by a thin film filter 20. The second trench may then be filled with a filler 28 that may be the same as the material 26 in one embodiment.

Light traveling through the waveguide 16 then enters the material 28. It is partially reflected by the thin film filter 20 and partially transmitted. In particular, a wavelength lambda 1 is reflected and a wavelength lambda 2 is passed. The reflected wavelength lambda 1 is detected by a first photodetector 24a. The wavelength lambda 2 is reflected by the mirrored surface 22 and is detected by a second photodetector 24b.

The thin film filter 20 may be a multilayer thin film filter designed to transmit light at a specified wavelength at an angle of incidence of 45° and to reflect all other wavelengths, in one embodiment. The light having two multiplexed wavelengths lambda 1 and 2, exiting from the waveguide core 16 remains nearly parallel traveling through the material 28 until it hits the thin film filter 20. The two wavelengths are de-multiplexed. The photodetectors 24 may be top down mounted. The waveguide core 16, thin film filter 20 and mirrored surface 22 may all be fabricated at the wafer level, in volume production.

Figure 2:
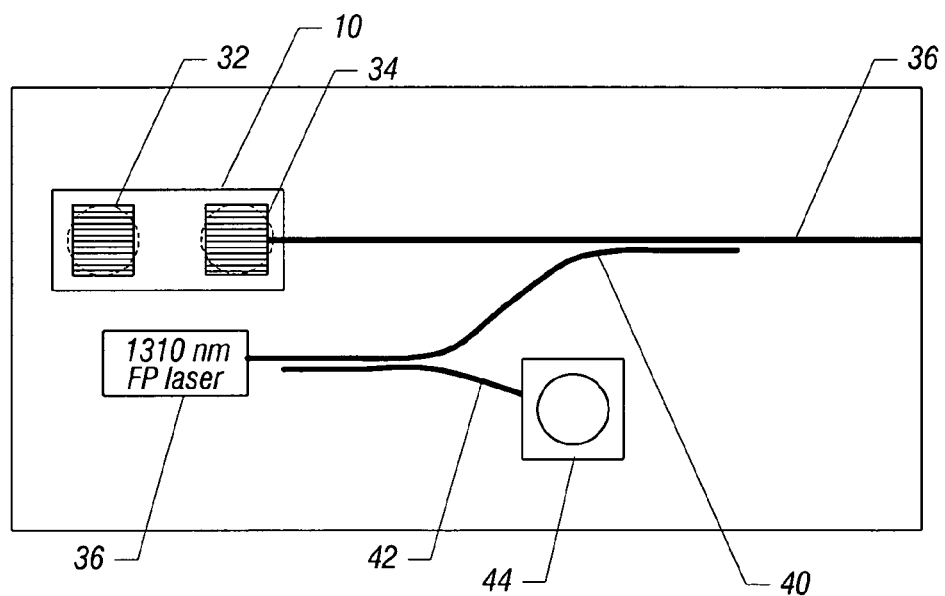
FIG. 2 is a top plan view of an embodiment of the present invention using the structure shown in FIG. 1.

Referring to FIG. 2, one application of the structure shown in FIG. 1 is in connection with fiber to home applications. In such applications two inbound wavelengths need to be de-multiplexed. For example, for a triplexer, three signals are presented. The outgoing signal may be a 1310 nanometer signal produced by a Fabry-Perot (FP) laser. Two incoming signals may be at 1550 nanometers for analog signals and 1490 nanometers for digital signals. The analog and digital signals can be de-multiplexed using the circuit 10 shown in FIG. 1.

A photodetector 44 may be coupled to a waveguide 42 to detect the characteristics of the outgoing 1310 nanometer laser light. The laser light may be coupled through a coupler 40 to a waveguide 36. The waveguide 36 provides the light to the de-multiplexing planar light circuit 10 and particularly to the digital photodetector 32 and the analog photodetector 34.

Figure 3:
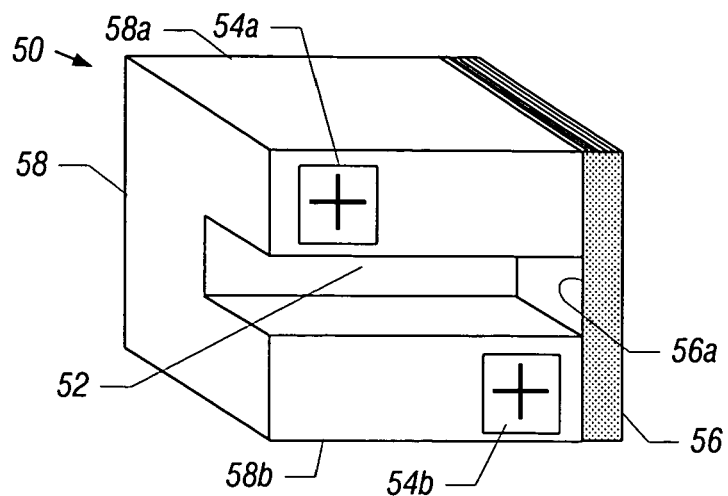
FIG. 3 is an enlarged perspective view of another embodiment of the present invention.

Referring to FIG. 3, a thin film filter module 50 includes a body 58 and a thin film filter 56. The body 58 is U-shaped having arms 58a and 58b. The arm 58a has an alignment mark 54a positioned farther away from the filter 56 and the arm 58b has an alignment mark 54b closer to the filter 56. A slot 52 is formed through the center of the module 50 leaving a freestanding portion 56a of the filter 56.

Figure 4:
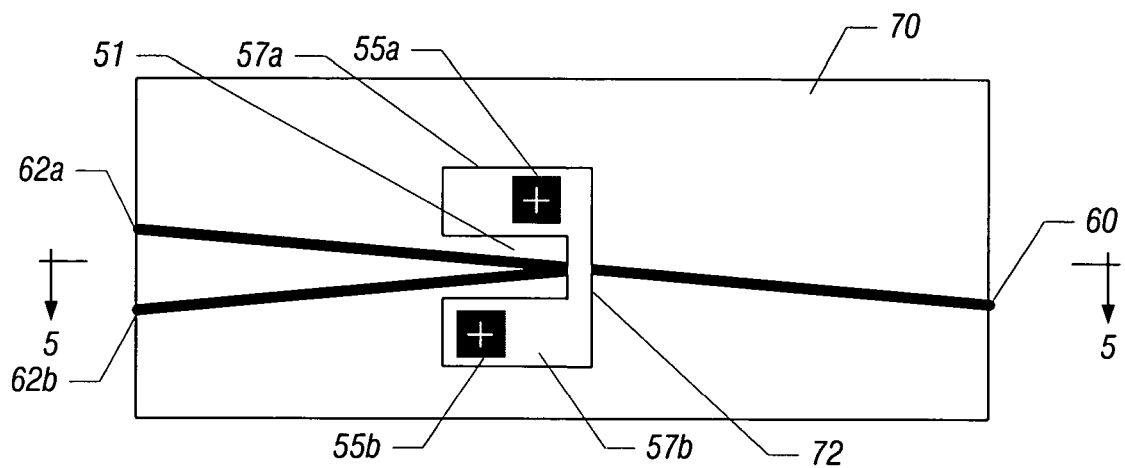
FIG. 4 is a top plan view on a planar light circuit in accordance with one embodiment of the present invention.

Referring to FIG. 4, a planar light circuit 70 includes a U-shaped waveguide including a first section 62a and a second section 62b. An output waveguide 60 extends from a U-shaped trench 72 formed in the planar light circuit 70. The trench 72 is arranged to receive the module 50 with the alignment marks 54a and 54b facing downwardly and aligning with the alignment marks 55a and 55b respectively in the U-shaped trench 72.

Figure 5:
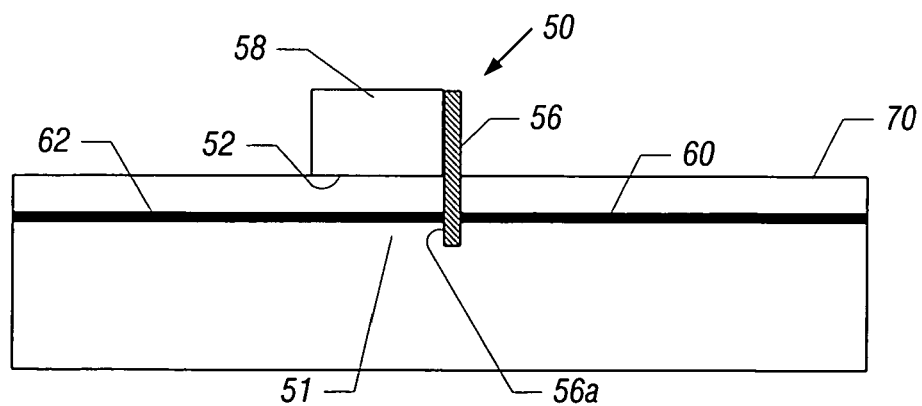
FIG. 5 is a cross-sectional view taken generally along the line 5—5 in FIG. 4 with the filter shown in FIG. 3 at reduced size in position on the planar light circuit of FIG. 4 in accordance with one embodiment of the present invention.
Figure 6:
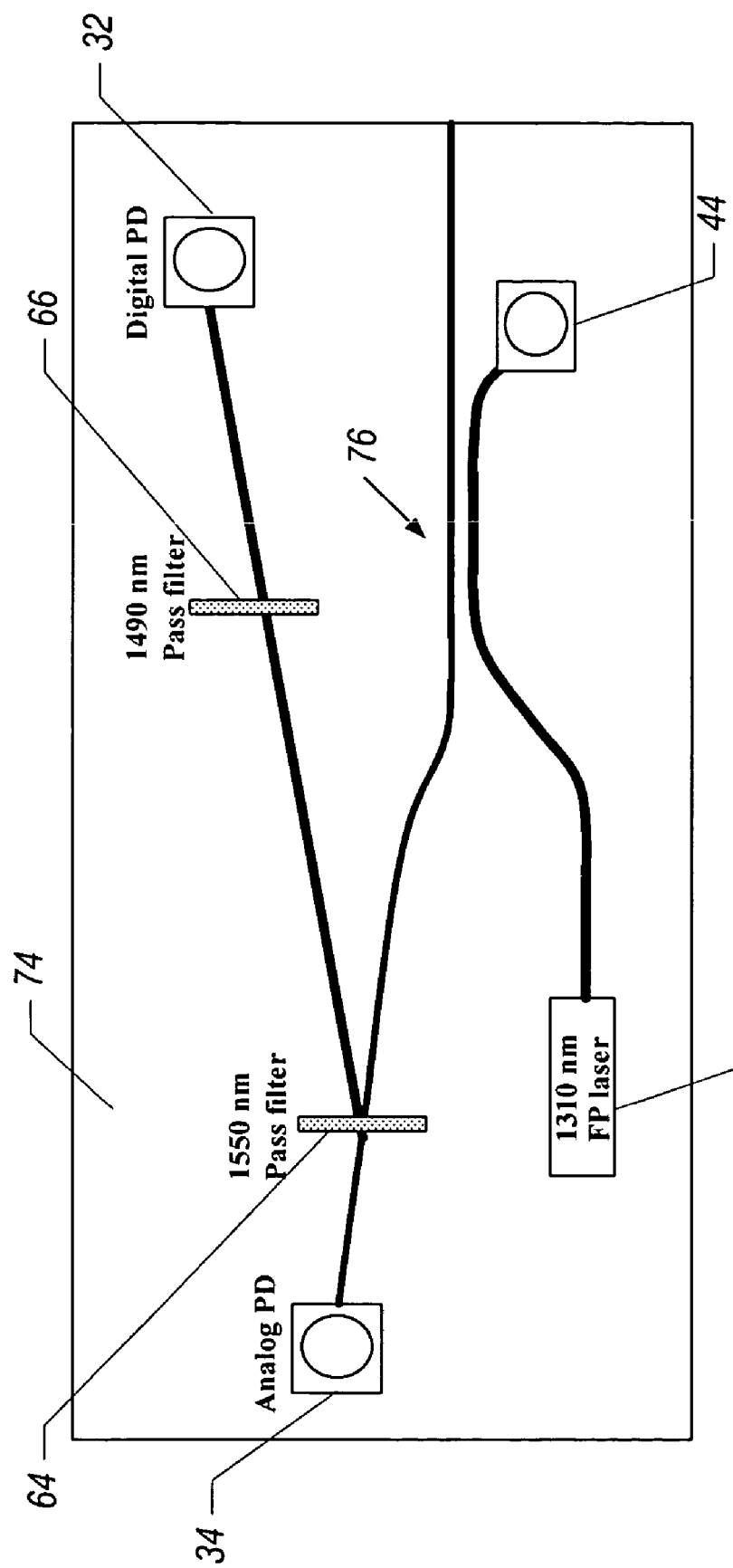
FIG. 6 is a top plan view of another embodiment of the present invention.

Referring next to FIG. 5, the module 50 is in position within the trench 72 with the freestanding portion 56a of the thin film filter 56 between the waveguides 62 and 60. As a result, the separation between the input and output waveguides may be dramatically reduced. This may have the effect, in some embodiments, of reducing insertion losses associated with the thin film filter 56.

The body 58 of the module 50 may sit on top of the planar light circuit 70 so that the slot 52 of the module 50 receives the tongue 51 (FIG. 4) of the planar light circuit 70.

In some embodiments, the module 50 may be thermal compression or epoxy bonded to the planar light circuit 70. Mask and wafer processes may be utilized to define alignment, and as a result, the module 50 and planar light circuit 70 may be less sensitive to lateral and vertical offset of the thin film filter 56. By putting alignment marks 55 at the bottom of the planar light circuit 70 trench 72 and marks 54 on the thin film filter module 50, accurate horizontal angular alignment may be achieved in some embodiments. The vertical alignment, defined by the flatness of the trench 72 of the planar light circuit 70 surface, can also be accurately controlled.

In some embodiments, the waveguide 60 may be replaced with a photodetector. Such embodiments may be utilized for direct thin film filter to high speed photodetector coupling. The light beam may show relatively little divergence with the thickness of the thin film filter 56, so the active area of the photodetector can be as small as the mode size of the waveguide, enabling high speed signal detection in some embodiments.

The low loss and easy drop in placement approach described above applies to many other micro optical elements. For example, the thin film filter 56 may be replaced with a micro-lens to enable planar beam collimation, a diffractive optical element such as a diffractive grating and a diffractive lens to enable wave length multiplexing or de-multiplexing in beam collimation.

Another advantage of some embodiments is the small form factor of the entire device, because the planar light circuit 70 defines the light path without the need for collimation optics. Also the thin film filter 56 may be much shorter in some embodiments than corresponding planar light circuit grating components for a single wavelength, add/drop multiplexer.

Lower insertion loss makes many applications possible. Those applications may be based on a low cost transceiver or triplexer for fiber to the home applications. The transceiver or triplexer may include a planar light circuit 74, a coupler 76, a laser diode 36, a thin film filter 56, and photodiodes 32 and 34.

The coupler 76 couples out the outgoing digital signal at 1310 nanometers to the main network. Incoming signals at 1490 and 1550 nanometers carry digital and analog signals that need to be de-multiplexed to two different photodiodes. Lower insertion loss and cross-talk may be achieved by the optical design and coating of the thin film filter 56. All the elements can be placed in a top down manner, so that assembly becomes simple and volume production is possible. Each of the filters 64 and 66 may pass a different one of the analog or digital wavelengths.

Figure 7:
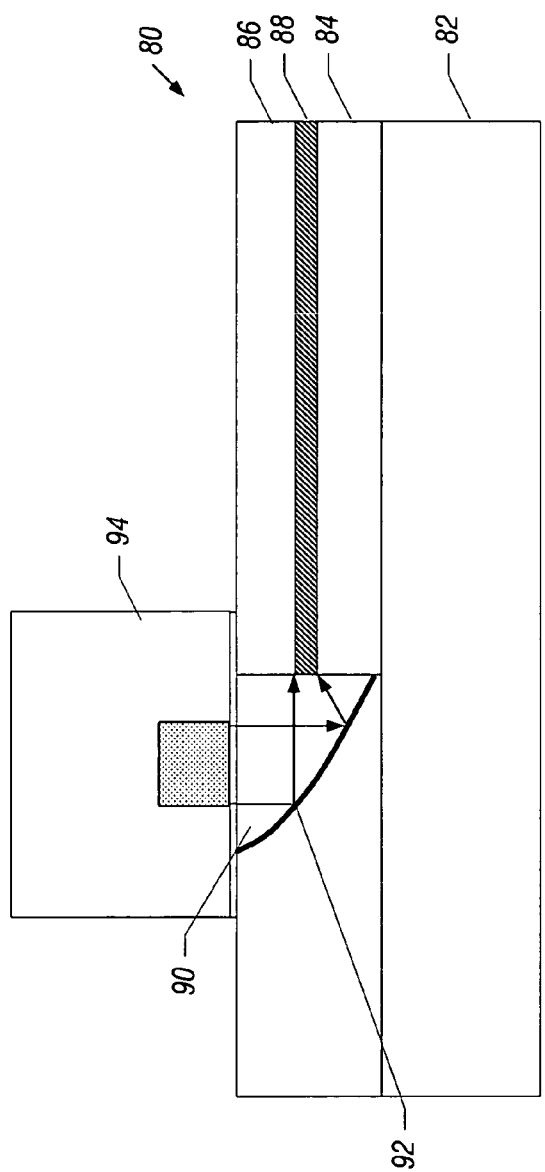
FIG. 7 is an enlarged cross-sectional view of another embodiment of the present invention.

Referring to FIG. 7, over the substrate 82 is a lower cladding 84 beneath the waveguide 88. In one embodiment, a trench may be formed using conventional semiconductor fabrication techniques. A curved trench wall may be coated with a mirrored surface 92 and the trench may be filled with fill material 90. A laser 94 may be positioned over the trench.

Vertical cavity surface effect lasers (VCSEL) have a mode designed to match that of a single mode fiber in telecommunications applications but its coupling to the fiber still requires some alignment. The integration to waveguide becomes even more challenging because of the possible mode mismatch and implementation of vertical alignment due to the geometry.

The sidewall of the trench opposite to the waveguide facet may be made at 45°. A spherical surface or vertically tapered mirror or any other kind of optical surface acts as a mode converter between the active device such as the laser or photodiode. The surface can be created on a sidewall using lithographic methodology and a grey scale mask. A metal coating on the surface constructs a convex mirror. The curvature of the surface is based on the mode size of the laser 94 and that of the waveguide 88 to be coupled, with consideration of the relatively long Rayleigh-length which makes the vertical alignment sensitivity relatively low.

A direct placement of the laser 94 on top of the trench enables laser light to be coupled into the waveguide 88. Both vertical and horizontal alignment may be determined by the lateral location of the laser 94. Thus a laser alignment may become truly two dimensional in some embodiments. As the whole alignment scheme can be implemented by putting alignment marks on both the laser and the planar light circuit 80 at the wafer level, passive alignment with low insertion loss is possible in some embodiments.

Figure 8:
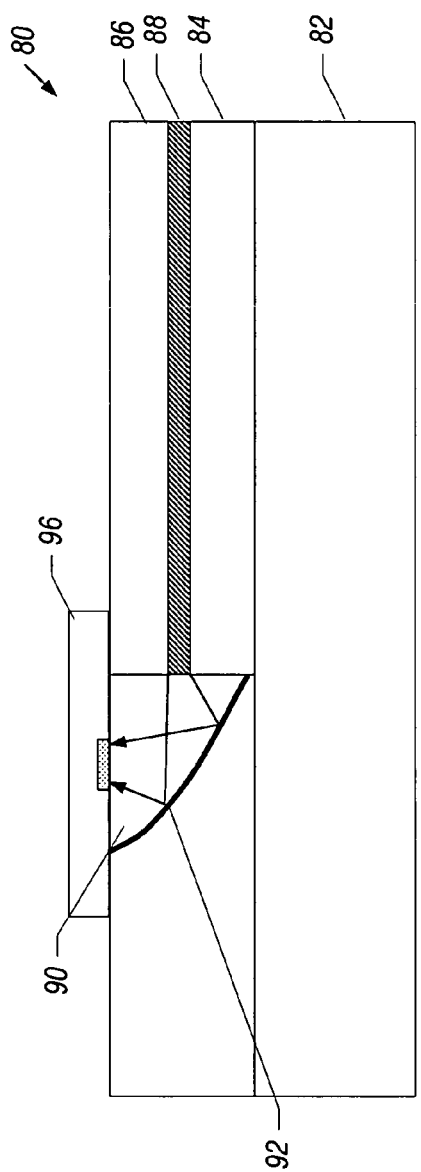
FIG. 8 is an enlarged cross-sectional view of still another embodiment of the present invention.

Referring to FIG. 8, a reverse application of the concepts set forth in FIG. 7 may be utilized to provide high speed signal detection. The detector 96 has a small active area or aperture for high modulation speed. The convex mirror 92 focuses the divergent beam exiting from the waveguide 88 into the aperture of the photodetector 96 for low insertion loss and high signal to noise detection. Again the detector 96 may be surface mounted in a passive alignment approach.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An optical demultiplexer comprising:
   a semiconductor substrate;
   a waveguide core over said substrate;
   a thin film filter to reflect light of at least one wavelength and to pass light of at least one other wavelength arranged in alignment with said waveguide core; and
   a reflective surface aligned with said thin film filter and said waveguide core to reflect light of a wavelength passed by said thin film filter.

2. The demultiplexer of claim 1 including a photodetector arranged to detect light reflected by said thin film filter.

3. The demultiplexer of claim 1 including a photodetector to detect light reflected by said reflective surface.

4. The demultiplexer of claim 1 including upper and lower cladding on said core and a trench through said cladding defining said reflective surface, said trench filled with a filler material whose index of refraction matches that of said cladding, said thin film filter formed on said filler material.

5. A method comprising:
   forming a slot between a pair of waveguide cores in a planar light circuit;
   mounting a thin film filter on a U-shaped module so that a portion of said thin film filter is unsupported; and
   inserting said module between said waveguide cores.

6. The method of claim 5 including forming an aperture in said planar light circuit to receive said module and inserting said thin film filter into said slot and inserting said module into said planar light circuit aperture.

7. The method of claim 6 including providing alignment marks on said module and said planar light circuit to align said module with said planar light circuit.

8. A planar light circuit comprising:
   a first waveguide and a second waveguide, said waveguides separated by a slot; and
   a thin film filter in said slot between said waveguides, said thin film filter mounted on a module, said module including alignment marks and said planar light circuit including alignment marks.

9. The circuit of claim 8 including an aperture in said planar light circuit to receive a portion of said module.

10. The circuit of claim 9 wherein said module is U-shaped including a slot through its lower surface providing an unsupported portion of said thin film filter.

11. The circuit of claim 10 wherein said slot fits over a portion of said planar light circuit and allows one of said waveguides to pass through said module.

12. A planar light circuit comprising:
a first waveguide; and
a trench formed in said planar light circuit, said trench having a curved reflective surface, said surface to act as a mode converter.

13. The circuit of claim 12 including a laser mounted over said trench on said circuit.

14. The circuit of claim 13 including a vertical cavity surface effect laser mounted over said trench.

15. The circuit of claim 12 wherein said reflector is spherical.

16. The circuit of claim 12 including a detector mounted over said trench.

17. A method comprising:
forming a trench in a planar light circuit;
forming a curved reflective surface in said trench aligned with a waveguide in said circuit; and
using said reflective surface to convert the mode of light extending to or from said waveguide.

18. The method of claim 17 including mounting a laser over said trench on said circuit.

19. The method of claim 17 including forming a spherical reflective surface.

20. The method of claim 17 including mounting a vertical cavity surface effect laser over said trench.

21. The method of claim 17 including mounting a detector over said trench.

* * * * *